United States Patent
Bolotski et al.

(10) Patent No.: US 11,086,336 B1
(45) Date of Patent: Aug. 10, 2021

(54) WIRELESS COMMUNICATION WITH ROBOTS TASKED WITH SORTING ITEMS

(71) Applicant: Amazon Technologies, Inc., Seattle, WA (US)

(72) Inventors: Josephine Ammer Bolotski, Seattle, WA (US); Emilia S. Buneci, Seattle, WA (US); Sachin Rajendra Kothari, Issaquah, WA (US); Unnikrishnan Vadakkanmaruveedu, Chandler, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 496 days.

(21) Appl. No.: 16/000,766

(22) Filed: Jun. 5, 2018

(51) Int. Cl.
*G05D 1/02* (2020.01)
*G05D 1/00* (2006.01)
*B07C 3/08* (2006.01)
*B65G 1/04* (2006.01)

(52) U.S. Cl.
CPC .......... *G05D 1/0289* (2013.01); *G05D 1/0088* (2013.01); *G05D 1/0225* (2013.01); *B07C 3/087* (2013.01); *B65G 1/0492* (2013.01); *G05D 2201/0216* (2013.01)

(58) Field of Classification Search
CPC .. G05D 1/0289; G05D 1/0225; G05D 1/0088; G05D 2201/0216; G05D 1/0214; G05D 2201/0212; B07C 3/087; B65G 1/0492; Y10S 901/01; G05B 19/41895; G05B 19/4061

USPC ................................................... 700/248, 255
See application file for complete search history.

(56) References Cited

U.S. PATENT DOCUMENTS

| | | | | |
|---|---|---|---|---|
| 3,734,229 A | * | 5/1973 | Comer | B62D 1/24 180/168 |
| 7,861,844 B2 | | 1/2011 | Hayduchok et al. | |
| 2008/0277243 A1 | * | 11/2008 | Hayduchok | B65G 1/065 198/463.6 |

OTHER PUBLICATIONS

Identify _ Definition of Identify at Dictionary.com.pdf (Identify | Definition of Identify at Dictionary.com, Dictionary.com, https://www.dictionary.com/browse/identify, pp. 1-6) (Year: 2021).*

* cited by examiner

*Primary Examiner* — Bao Long T Nguyen
(74) *Attorney, Agent, or Firm* — Patterson + Sheridan, LLP

(57) ABSTRACT

Embodiments herein describe a controller for a machine that wirelessly transmits a destination address to a robot which is tasked with transporting an item to the destination corresponding to the received address. Using the address, the robot can select a predefined path stored in its memory for that address. Because multiple robots can move items in the machine at the same time, the robots may collide if their predefined paths intersect. The machine can use a variety of different techniques to prevent collisions between the robots as the robots deliver items to different locations along their predefined paths.

20 Claims, 8 Drawing Sheets

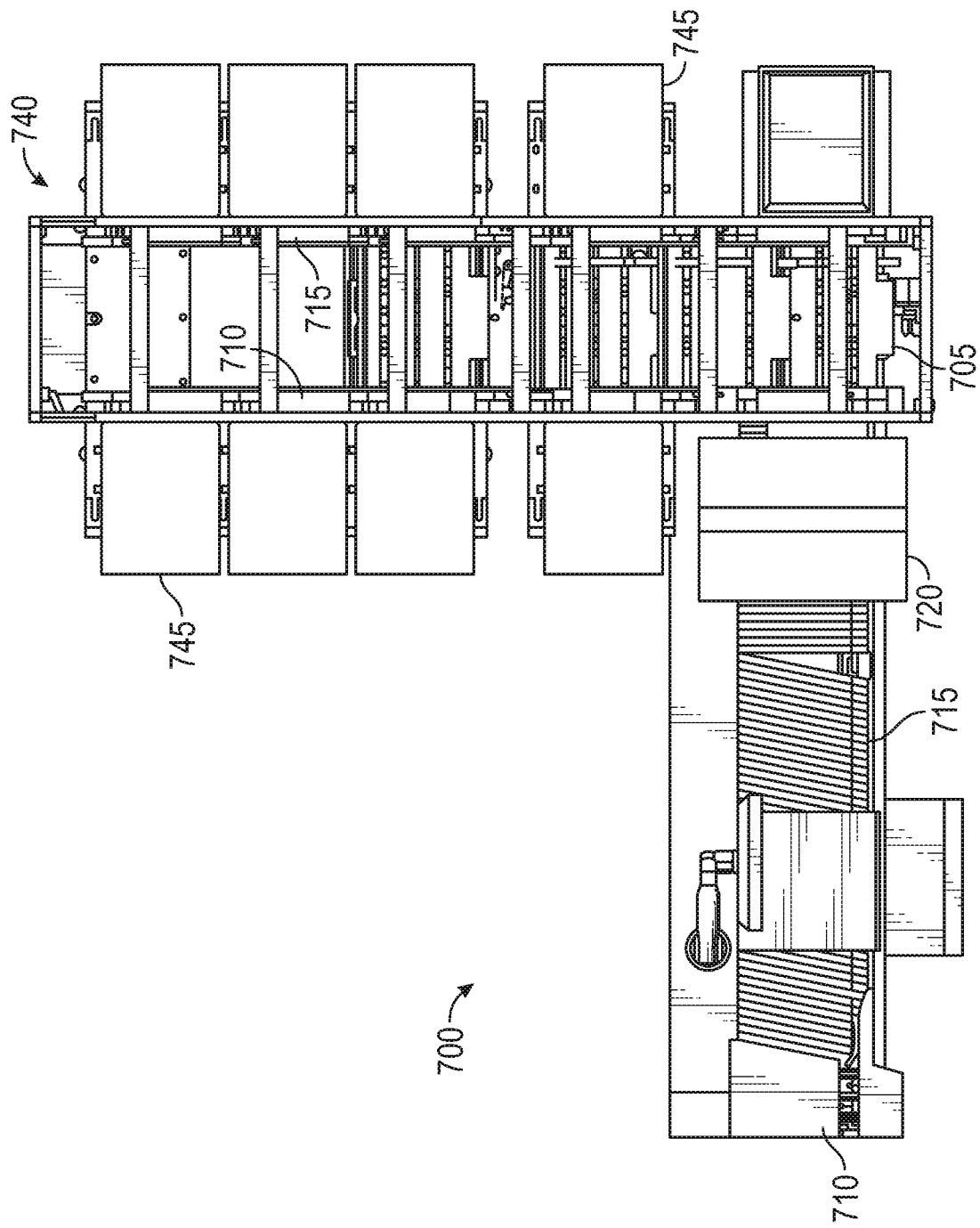

WIRELESS COMMUNICATION WITH ROBOTS TASKED WITH SORTING ITEMS

BACKGROUND

Automation relies on machines to perform tasks such as transporting items between locations in a warehouse, assembling or manufacturing products, sorting items, packaging items, removing items from packaging, and the like. The machines may be controlled using wireless signals from a controller. Bandwidth becomes limited as more and more machines which rely on wireless control are spaced closer together. For example, to reduce the amount of occupied floor space (e.g., the footprint), a manufacturer or distributor may space the wirelessly controlled machines such that the wireless signals transmitted for controlling one machine can interfere with the wireless signals transmitted to another, neighboring machine.

To mitigate interference, the wireless signals transmitted to one machine may use a different wavelength (or range of wavelengths) than the wireless signals transmitted to another machine. In this manner, the machines can be allocated different portions of the bandwidth using non-interfering wireless signals. However, as the density of machines increases, the amount of bandwidth (e.g., the available wavelengths) becomes limited. Because of bandwidth constraints, the same wavelengths may be used to transmit controls to two different machines. If the signals transmitted to one of the machines reach the other machine, the signals can cause interference which prevents the other machine from reliably receiving the wireless signals intended for it.

BRIEF DESCRIPTION OF DRAWINGS

Various embodiments in accordance with the present disclosure will be described with reference to the drawings, where like designations denote like elements.

FIGS. 7 and 8 illustrate an apparatus for sorting items, according to various embodiments.

DETAILED DESCRIPTION

Figure 1:
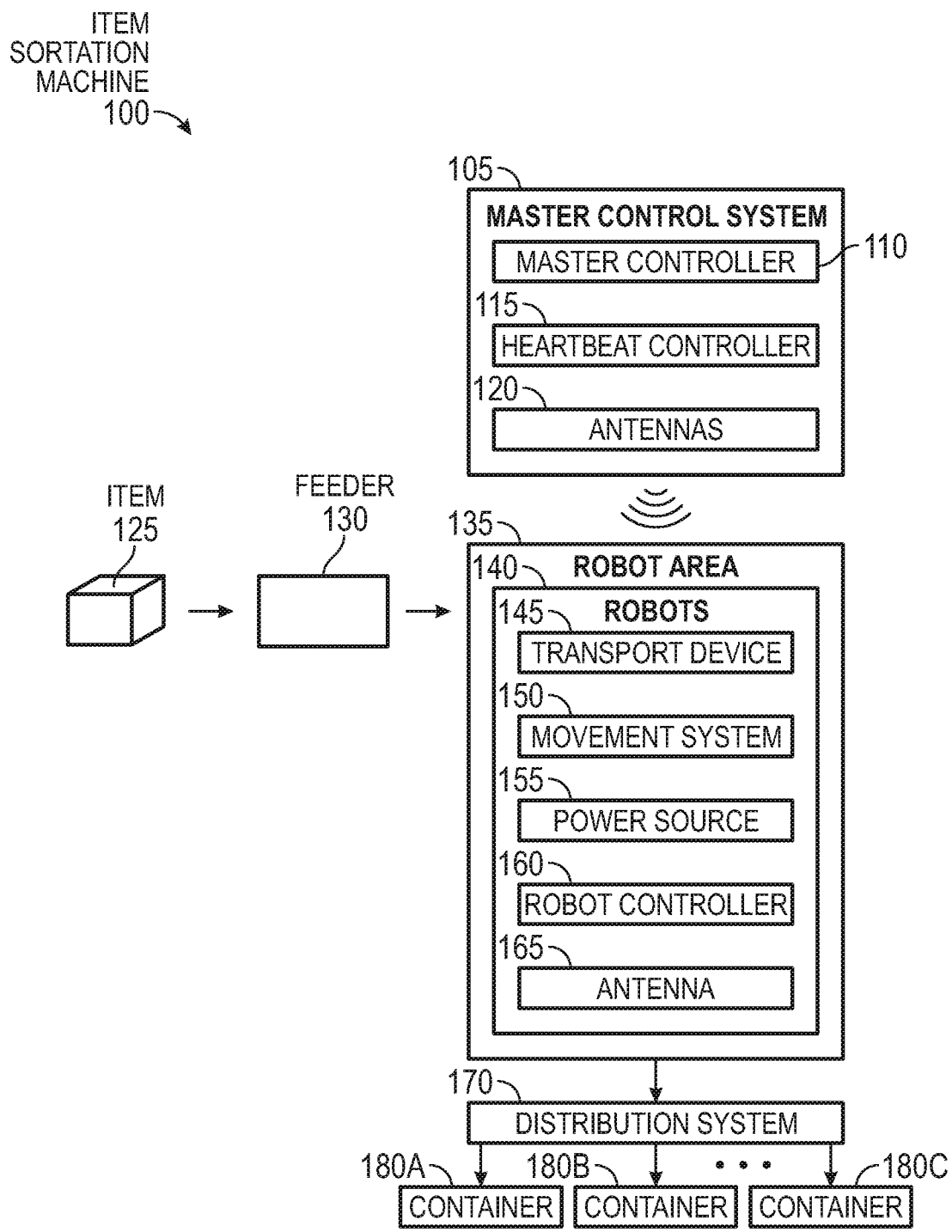
FIG. 1 illustrates an item-sortation machine, according to various embodiments.

Embodiments herein describe wireless transmission techniques for mitigating interference between wirelessly controlled machines in a shared space—e.g., a warehouse or plant. As the density of the machines increases, the demand for bandwidth may also increase. For example, many wireless communication standards—e.g., IEEE 802.11a/b/g/n/ac/ad—provide different channels for allocating bandwidth within their defined frequency band (e.g., 2.4 GHz, 5 GHz, or 60 GHz). That is, the different channels may correspond to a different wavelength or range of wavelengths in the frequency band. For example, each channel in the 2.4 GHz frequency band in some standards is 20 MHz wide. Machines that use different channels in the frequency band can generally communicate without interfering with each other (although some portions of the channels may be overlapping). However, wireless signals in the 2.4 GHz and 5 GHz frequency bands can travel up to 100 feet. Moreover, different machines may require multiple channels to operate. If the channels have to be re-used (e.g., different machines use the same channels to communicate) and the machines are not spread far enough apart, then the wireless signals can interfere with each other and prevent the corresponding machines from reliably receiving the signals. However, spreading out the machines to prevent interference means that more floor space (e.g., a bigger footprint) is required to operate the machines which may increase costs. The wireless techniques described herein permit the machine density to be increased while mitigating the likelihood the wireless signals intended for one machine interfere with another machine.

To mitigate interference between neighboring machines, the machines may be assigned different channels within the same frequency band. For example, Machine A is assigned Channel 1, Machine B is assigned Channel 2, and so forth. However, there are a limited number of channels in each frequency band and some machines may require multiple channels further restricting the bandwidth. Thus, the channels may have to be reused which can result in interference if the machines are within wireless range of each other and transmit signals at the same time. For example, wireless signals for IEEE 802.11a/b/g/n/ac have a range up to approximately 100 feet. If machines currently transmitting data on the same channel in one of these IEEE frequency bands are within 100 feet of each other, the wireless signals can interfere.

In another embodiment, multiple neighboring machines can use or share the same channel by reducing the amount of bandwidth used by each of the machines. That is, multiple machines can share the same channel so long as the bandwidth requirements of the machines are small enough to permit each of the machines time on the channel to perform wireless communication. For example, the machines may use clear channel assessment or time multiplexing to determine which machine can use the channel. If the machines have low bandwidth requirements (e.g., use less than 20% of the bandwidth available on the channel), then neighboring machines can share the same channel with little or no interference while maintaining the desired functionality.

To reduce bandwidth usage, in one embodiment, a controller in the machine transmits a destination address to a robot which is tasked with transporting an item to the destination corresponding to the received address. Using the address, the robot selects a predefined path stored in its memory for that address. In one example, the controller sends only one message which enables the robot to deliver an item to its corresponding destination. This technique may use considerably less bandwidth than a system where the controller transmits a series of commands for moving a robot in small increments (e.g., a few inches at a time) to reach its destination.

The machine may also use a variety of different techniques to prevent collisions between multiple robots as the robots deliver items to different locations. That is, the predefined paths used by the robots when delivering items may cross such that a collision can occur. To prevent collisions, in one embodiment, the machine transmits synchronization messages to the robots that indicate whether a robot should continue along its predefined path or stop. For example, if the controller determines the paths of two robots are about to collide, the machine can pause one of the robots to permit the other robot to pass. These synchronization messages can be sent intermittently (e.g., every ten milliseconds) and be broadcasted to the robots thereby mitigating bandwidth usage. In other embodiments, the robots themselves can use a collision prevention technique by communicating with each other or using predefined time slots to prevent collisions at intersections.

FIG. 1 illustrates an item-sortation machine 100, according to various embodiments. Generally, the machine 100 sorts received items 125 into containers 180 using wirelessly controlled robots 140. However, the wireless communication techniques described herein are not limited to such and can be used in any wireless controlled machine (or robot(s)) such as a machine for moving containers or racks in a warehouse, removing an item from a package, packing an item into a shipping container, picking an item, and the like. The embodiments herein can be used in any machine that relies on wireless control signals which can interfere with other wireless controlled machines in a shared area (e.g., a warehouse, sorting facility, mail processing facility, packing facility, etc.).

The sortation machine 100 includes a master control system 105, a feeder 130, a robot area 135, and a distribution system 170. The master control system 105 provides the wireless control signals using a master controller 110 and antenna 120 (e.g., a transmit/receive antenna) which control the actions of the robots 140 in the robot area 135. For example, the master control system 105 may wirelessly send move commands, pick-up commands, drop commands, stop commands, and the like which control how the robots 140 move themselves, and the item 125, in the robot area 135. The master control system 105 also includes a heartbeat controller 115 which uses the antennas 120 to transmit a wireless heartbeat (or E-stop) signal to the robots 140. In one embodiment, the robots 140 perform the commands received from the master controller 110 only as long as the heartbeat signal is received. That is, if the heartbeat controller 115 stops sending the heartbeat signal, the robots immediately stop (e.g., within a few millisecond) their current task. In one embodiment, the heartbeat signal is used to stop the robots 140 in the case of an emergency or a malfunction. Because the robots 140 could hurt a human near the machine 100 or damage the machine 100 during a malfunction, once an emergency is detected, the heartbeat controller 115 can deactivate the heartbeat signal which immediately stops the robots 140 to prevent harm to a human operator or the machine 100 itself. The heartbeat controller 115 may deactivate the heartbeat signal in response to a human operator pressing an emergency button, detecting a malfunctioning robot 140, sensor information (e.g., a vibration sensor), and the like. Once the emergency is handled, the heartbeat controller 115 can resume transmitting the heartbeat signal which indicates to the robots 140 they can begin to perform the commands received from the master controller 110.

In one embodiment, the master controller 110 and the heartbeat controller 115 include processors or micro-controllers. The master controller 110 and the heartbeat controller 115 can include solely hardware and firmware or can include combinations of hardware and software elements. Although not shown, the control system 105 can include master controllers 110 for multiple different machines 100. For example, the control system 105 can refer to multiple independently operating master controllers 110 for controlling respective machines 100, synchronized master controllers 110, or a single master controller 110 which controls multiple different machines 100.

The feeder 130 is a structure that moves the item 125 into the robot area 135. For example, the robot area 135 may be an enclosure that establishes an area where the robots 140 move. The feeder 130 may be a chute which slides the item 125 into a receiving area in the robot area 135, a conveyor belt which moves the packages into the area 135, or a container in which a human places the items 125. In any case, the robots 140 can retrieve the item 125 once the item 125 arrives in the robot area 135 and use wireless messages received from the master control system 105 to move the item to the distribution system 170 where the item is stored in one of the containers 180.

The machine 100 can include any number of robots 140, e.g., one, two, three, four, etc. As shown, each robot 140 includes a transport device 145, a movement system 150, a power source 155, a controller 160, and at least one antenna 165. The transport device 145 permits the robot 140 to carry the item 125 to different locations in the robot area 135. For example, the robot area 135 may be a fenced off enclosure on the warehouse floor or a frame which includes tracks which the robots 140 can follow. The robots 140 can move along the floor and/or vertically using the frame. In another example, a portion of the robots 140 (or the entire robot) may remain stationary in the robot area 135. For instance, the base of the robot 140 may be anchored while an extension of the robot (e.g., a robotic arm) can move to pick up the items 125 and move them to different locations. The transport device 145 may include a claw or suction cup for lifting or picking the item 125. In another example, the transport device 145 may be a conveyor that receives the item 125 from a conveyor belt in the feeder 130. In another embodiment, the transport device 145 may be a bin in which the feeder 130 places the item 125.

The movement system 150 may move the entire robot 140 or a portion of the robot 140 within the robot area 135. For example, the movement system 150 may include wheels or bearings which permit the robot 140 to move along the floor or along tracks. In another example, the movement system 150 includes an arm attached to the transport device 145 to move the item 125. For example, the robot area 135 may include a central conveyor belt that moves received items 125 past the robots 140. The master controller 110 can instruct a selected one of the robots 140 to pick up the item 125 as it passes using the movement system 150 and the transport device 145 to place the item 125 into the distribution system 170.

The power source 155 in the robots 140 can be a battery or a capacitor. For example, the robots 140 may move relative short distances (e.g., less than 50 feet) before they return to recharge. In that case, the charge on a large capacitor (or capacitors) can be sufficient to move the robot 140 before the robot 140 returns to a charging station or rail to recharge the capacitor. The advantage of using a capacitor as the power source 155 is that it can provide high currents and recharge in a shorter time than a battery, although either is acceptable. In another example, if the entire robot 140 does not move within the robot area 135, then the robot can be connected to a power grid (e.g., plugged into a power outlet) where the power source 155 can be a power converter.

The robot controller 160 can be a processor or a micro-controller which receives commands from the master controller 110 using the antenna 165 and issues corresponding commands to the transport device 145 and movement system 150. For example, if the master controller 110 instructs the robot 140 to move the item 125 to a particular location in the robot area 135, the robot controller 160 in turn issues one or more commands to the movement system 150 to move the robot to the desired location. In one embodiment, in addition to receiving information from the master controller 110, the robot controller 160 can transmit information to the master controller 110. For example, the robot controller 160 may use the antenna 165 to inform the master controller 110 when a command has been completed successfully. The robot controller 160 may send other information wirelessly to the master controller 110 such as the charge on the power source 155, status of the transport device 145 or movement system 150 (if there is a malfunction or needs repair), if the item 125 was dropped, and the like. In one embodiment, the robot controller 160 may be entirely hardware, but in other embodiments may include a combination of hardware/firmware and software.

In one embodiment, the distribution system 170 receives the item 125 from the robot 140 and places the item 125 in one of the containers 180. The distribution system 170 may be multiple access apertures (e.g., a filing system) with corresponding chutes that lead to the containers 180. Using the transport devices 145, the robots 140 can move the items 125 through the apertures in the distribution system 170 and into the containers 180. In another example, the distribution system 170 may include fasteners or platforms for coupling the containers 180 to the distribution system 170. For instance, distribution system may form a rack on which the containers 180 are mounted. The robots 140 can travel to the portion of the rack that stores the corresponding container 180 for the package and place the item 125 into the container 180.

In one embodiment, the containers 180 are assigned different destinations either within the warehouse or to an external location (e.g., a different warehouse or mailing code). Moreover, the containers 180 may correspond to different shipping companies. In one embodiment, the master controller 110 knows the desired destination of the items 125, which may be determined by scanning a bar code or reading an RFID tag on the item 125 when in the feeder 130. The master controller 110 can then provide instructions to the robots 140 to move the item 125 to the appropriate location in distribution system 170 such that the item 125 is stowed in the container 180 corresponding to its destination. In this manner, the item-sortation machine 100 can provide wireless commands to the robots 140 for sorting received items 125 into the containers 180.

Figure 2:
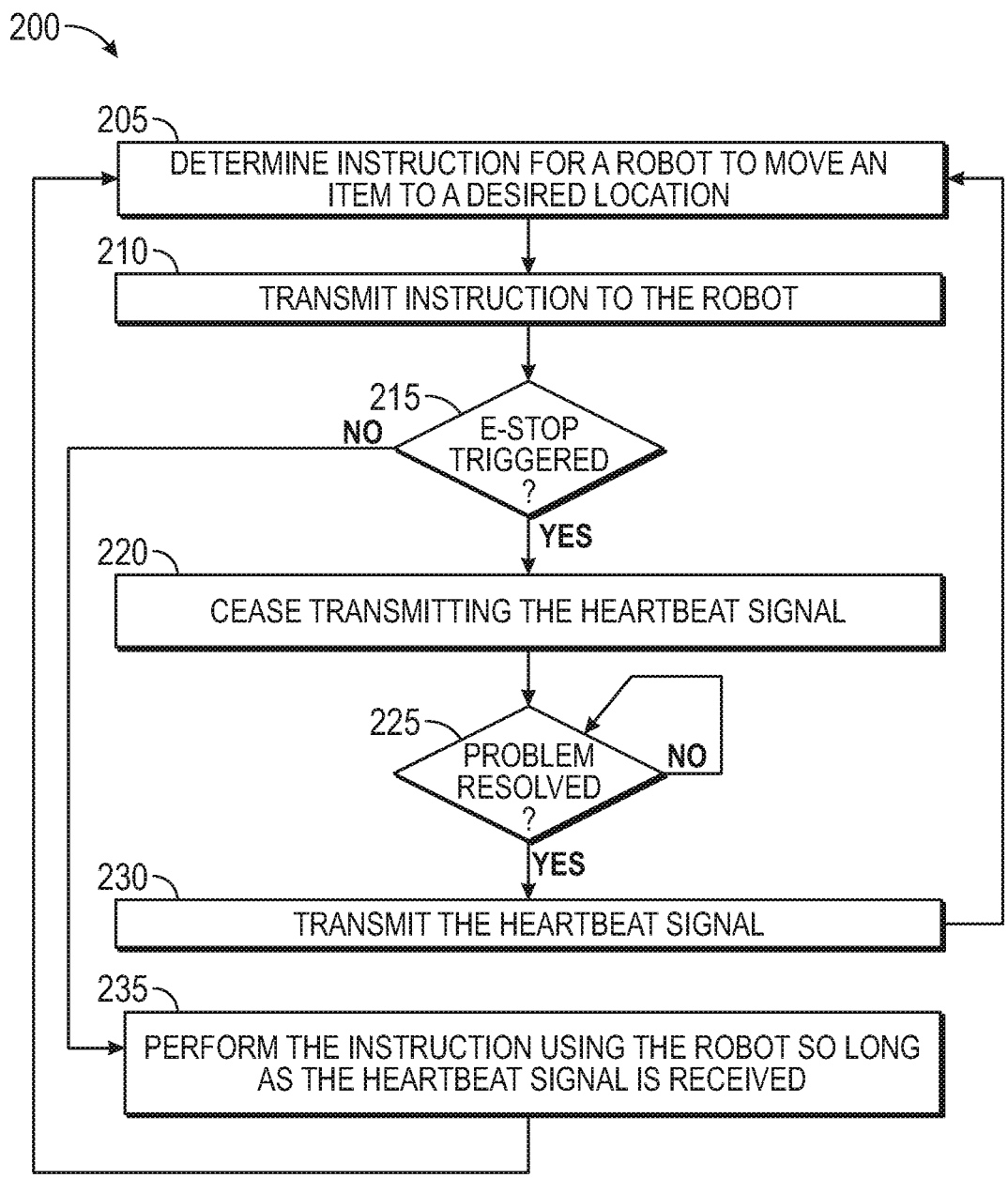
FIG. 2 is a flowchart for controlling robots in a machine using a heartbeat signal and wireless instructions, according to various embodiments.

FIG. 2 is a flowchart of a method 200 for controlling robots in a machine using a heartbeat signal and wireless commands, according to various embodiments. For ease of explanation, the method 200 describes controlling the robots 140 in the item-sortation machine 100 shown in FIG. 1. However, the method 200 can be used to control any kind of wireless controlled machine such as a single robot or a cluster of robots.

At block 205, the master controller determines instructions for a robot to move an item to a desired location. For example, the master controller may instruct the robot to pick up an item, move the item (or itself) to a different location, drop of the item, transfer the item to another robot, and the like. As used herein, the wireless command can include any command sent from the master controller to the robot to control the actions of the robot.

In one embodiment, the wireless command may include a location of the destination (e.g., an address or a unique number). For example, in FIG. 1, the location of each container 180 may correspond to a unique address. By providing the address, the master controller can inform the robot controller which container should receive the package. Using a single address or unique number to represent a destination may reduce bandwidth usage in the wireless channel relative to a master controller which sends a series of commands to the robot in order to navigate the robot to its destination (e.g., move five inches to the left, move two inches forward, etc.). Doing so avoids constantly sending updated instructions to the robots for navigating the robots to their desired destinations.

At block 210, the master controller wirelessly transmits the instruction to the robot. The master controller may transmit the instruction to a transmitter in the control system which uses on or more antennas to transmit commands to receivers in the robots. The transmitter in the control system can use various wireless transmission algorithms such as antenna diversity and multiple input multiple output (MIMO) to mitigate interference between neighboring machines.

At block 215, the heartbeat controller determines whether an E-stop has been triggered. For example, the machine (or the surrounding area) may include emergency stop buttons that can be pressed by a human operator in case of an emergency or malfunction. For example, if the operator needs to retrieve a dropped package or notices a malfunctioning robot, the operation can press the emergency button which triggers the E-stop. In another embodiment, the heartbeat controller triggers the E-stop without human input. The heartbeat controller may monitor sensors in the machine or receive periodic or emergency status updates for the robots. Using this information, the heartbeat controller can determine to trigger the E-stop.

If the E-stop is triggered, the method 200 proceeds to block 220 where the heartbeat controller ceases transmitting the heartbeat signal. In one embodiment, the heartbeat signal is a continuous signal with a predictable pattern such as a sine wave, a square wave, or a periodic pulse. In one example, the robots 140 may not receive commands using the heartbeat signal but rather monitor the signal to make sure they can continue to operate. Stated differently, the heartbeat signal may not transmit digital data to the robots but instead provides a deactivation signal for stopping the robots. As such, when the heartbeat controller stops transmitting the heartbeat signal at block 220, the controller in the robot may immediately stop the robot from moving (if currently moving) and prevent the robot from carrying out any commands that may be received from the master controller. In one embodiment, the controller in the robot may put the robots in a passive state so that the robots can be easily moved by the operator (in case the robot has malfunctioned or needs to be moved to address a safety concern or to retrieve a fallen item).

To improve safety, it may be desired that robots stop immediately when the heartbeat signal stops (e.g., less than a second and preferably less than a few milliseconds). As such, the embodiments herein describe techniques for mitigate interference that may occur from wireless signals transmitted by neighboring machines in a shared area. For example, separate heartbeat signals may be transmitted to neighboring machines. If those heartbeat signals reach both machines, then they can interfere with each other such that the robots may incorrectly determine that the heartbeat signal has ceased and stop its current action. Alternatively, if the E-stop is triggered for one of the machines, the robots in that machine may still receive the heartbeat signal intended for a neighboring machine and continue to operate which can lead to an unsafe situation.

To prevent interference with heartbeat signals intended for different machines, the heartbeat signals for neighboring machines may be transmitted on different channels of the same frequency band or on two separate frequency band. Further, the antenna used to transmit the heartbeat signal may be a directional antenna or use low transmit power (but have repeaters) to mitigate the heartbeat signal from one machine from reaching a neighboring machine.

If at block 225 the heartbeat controller determines the problem which triggered the E-stop is resolved, the method proceeds to block 230 where the heartbeat controller resumes transmitting the heartbeat signal and the master controller can resume normal control and operation of the robots in the machine. However, if the problem has not been resolved, the absence of the heartbeat signal keeps the machine in a shutdown state.

Returning to block 215, if the E-stop has not been triggered, the robot performs the command so long as the heartbeat signal is received. That is, in addition to checking that the heartbeat signal is active when a new command is received at the robot, the robot controller may continue to perform the action or actions indicated in the command only as long as the heartbeat signal remains active. For example, the robot controller may have a separate detection system which continually monitors the heartbeat signal to detect when the signal stops. In response, the detection system transmits an interrupt or override signal which stops the other functions in the controller. So long as the heartbeat signal remains active, the method 200 can repeat with the robots in the machine receiving new instructions or commands from the master controller and performing those commands.

Figure 3:
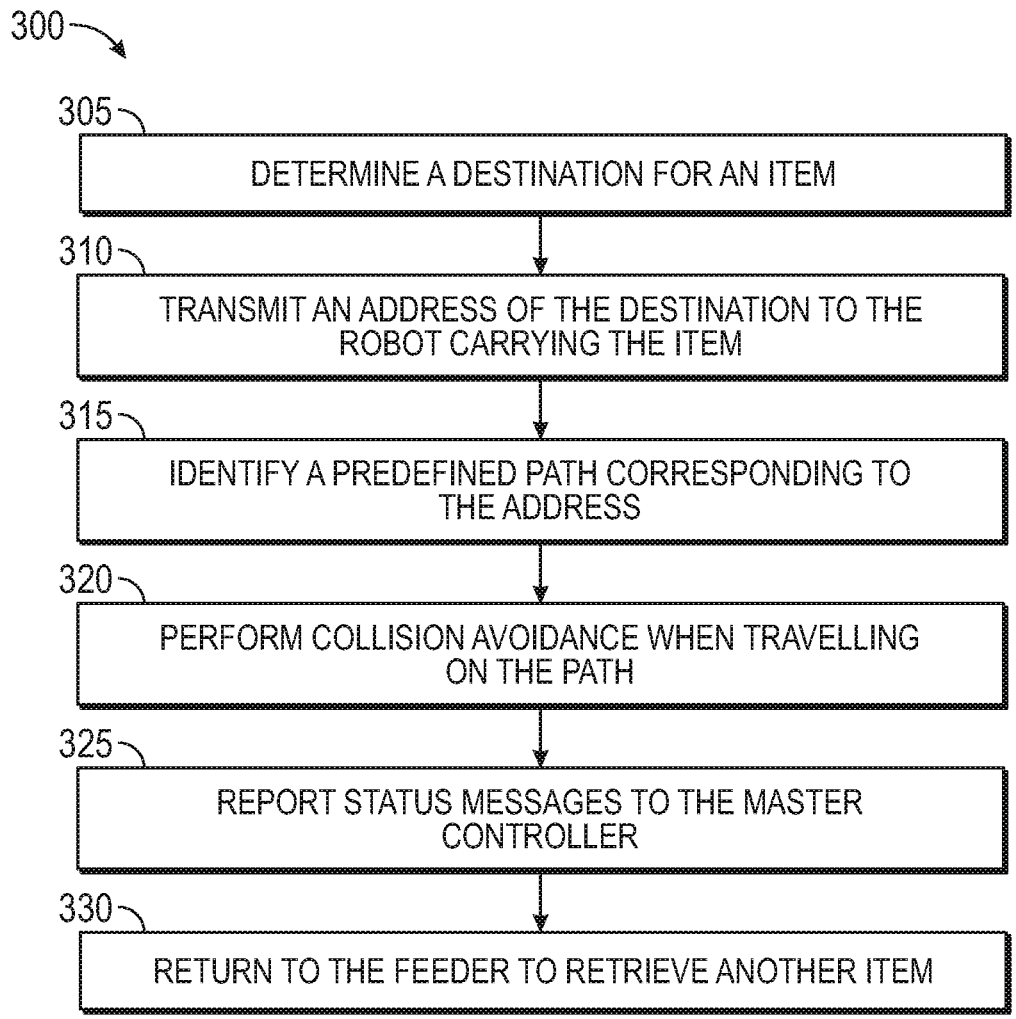
FIG. 3 is a flowchart for transmitting an address corresponding to a predefined path to a robot, according to various embodiments.

FIG. 3 is a flowchart of a method 300 for transmitting an address corresponding to a predefined path to a robot, according to various embodiments. In one embodiment, the method 300 is performed in parallel with transmitting the heartbeat signal, although not limited to such. Put differently, the method 300 can be performed in a machine that uses a heartbeat signal to perform an E-stop or a machine that does not. In the case of the former, the method 300 may proceed so long as the machine continues to receive the heartbeat signal. If the heartbeat signal ever stops being received, the item-sortation machine may behave as described in the method 200 in FIG. 2.

At block 305, the master controller determines a destination for an item received at the feeder of the item-sortation machine. In one embodiment, the master controller determines the desired destination of the received items by scanning a bar code or reading an RFID tag on the item when in the feeder. For example, the destination may be a zip code, a mail delivery route, or a third-party carrier service which will deliver the item. In another embodiment, the item may not be ready to be mailed, but rather is an item that is to be stored in a warehouse (where items of the same type are stored in the same container). In any case, the master controller correlates the destination of the item to a container connected to the item-sortation machine. For example, each destination may map to a particular location of one of the containers in the machine.

At block 310, the master controller transmits an address of the destination location to the robot carrying the item. That is, using wireless communication, the master controller sends a digital signal to the robot that contains the address of the location which corresponds to the container in which the robot should store the item. In one embodiment, the address may be encoded into a packet that includes a header and a payload, where the payload includes the address. The address can be encoded using a log base two encoding scheme.

In one embodiment, the addresses are encoded using a variable length encoding—e.g., a Huffman code. Doing so may reduce the length of the addresses of the more popular destinations. As a result, the packets including addresses for the more popular destination (which are sent more frequently) would include less data relative to the encoded addresses for less popular destinations thereby reducing the amount of wireless bandwidth used by the machine.

At block 315, the robot controller to which the address was transmitted identifies a predefined path corresponding to the address. In one embodiment, the robot controller includes memory which stores at least one predefined path for each of the potential addresses. Put differently, the robot controller may store at least one path to each item drop off point (e.g., a location of a container). The path can be divided into a plurality of different segments which the robot travels to reach the destination and return to the feeder to retrieve another package. The paths may be the shortest routes to the containers and back to the feeder, but do not have to be. For example, the path to the container may be different than the return path from the container to the feeder. That way, another robot can traverse the same path when dropping off an item without the threat of colliding with a robot returning from dropping off an item at the same container. In this example, the robots can all use the same path when delivering items to the same location or container.

However, the robots may be assigned different paths to the same container. Doing so may mitigate congestion in the machine. For example, for the more popular destinations, if the robots use the same ingress and egress paths, this may cause congestion and reduce throughput. Instructing some robots to use different paths to and from the same container may reduce congestion by increasing the areas of the machine used by the robots when storing items at the more frequently used destinations. In any case, using predefined paths reduces wireless communication between the robot controller and the master controller since the robot controller can use the path to navigate through the machine without relying on the master controller to provide it with turn-by-turn instructions to the destination.

At block 320, the robot controller performs collision avoidance when traveling on the path. There are generally two types of collision avoidance that the robot controller can perform. In one embodiment, the robot controller receives wireless instructions from the master controller (or some other component such as a traffic controller) for avoiding collisions, while in another embodiment the robot controller performs collision avoidance using an internal algorithm and/or by communicating with the other robots in the machine. While relying on instructions from the master controller reduces the amount of logic or processing that is done in the robot controller, it increases the amount of wireless traffic and bandwidth being used in the channel. When using an internal algorithm to perform collision avoidance, the robot controller can reduce or eliminate sending wireless traffic for collision avoidance but this may result in the robot controller containing more sophisticated hardware or software. The various techniques for avoiding collisions in the machine are discussed in more detail later.

At block 325, the robot controller reports status messages to the master controller regarding the robot. That status message may include a location of the robot in the machine, the status of the item being transported by the robot, charge level of the capacitor or battery powering the robot, and any error messages. This information may be encoded using a log base two encoding scheme to reduce the amount of data being sent to the wireless controller. Further, if some of this status information is sent more often than others (e.g., one error message is transmitted more frequently than others), the robot controller can use variable length encoding (e.g., Huffman code) that reduces the amount of data used to represent more frequent statuses.

Further, in one embodiment, the different types of status information may be grouped and sent in the same packet. For example, instead of sending separate wireless packets for updates in the battery level and error messages, the robot controller may wait to send updated status information for different status types in the same message. Doing so reduces the fixed cost related to transmitting the headers in the packets. That is, instead of sending multiple status update messages (which each have their own headers), the robot controller sends one message (with one header) that has a payload containing the data for all the various different status updates. Doing so may reduce the bandwidth utilization since the number of times a header is transmitted is reduced.

At block 330, the robot returns to the feeder to retrieve another item. The method 300 can then repeat where the master controller wirelessly provides an address for the item which the robot controller uses to identify a predefined path for transporting the item to its destination and returning to the feeder.

Figure 4:
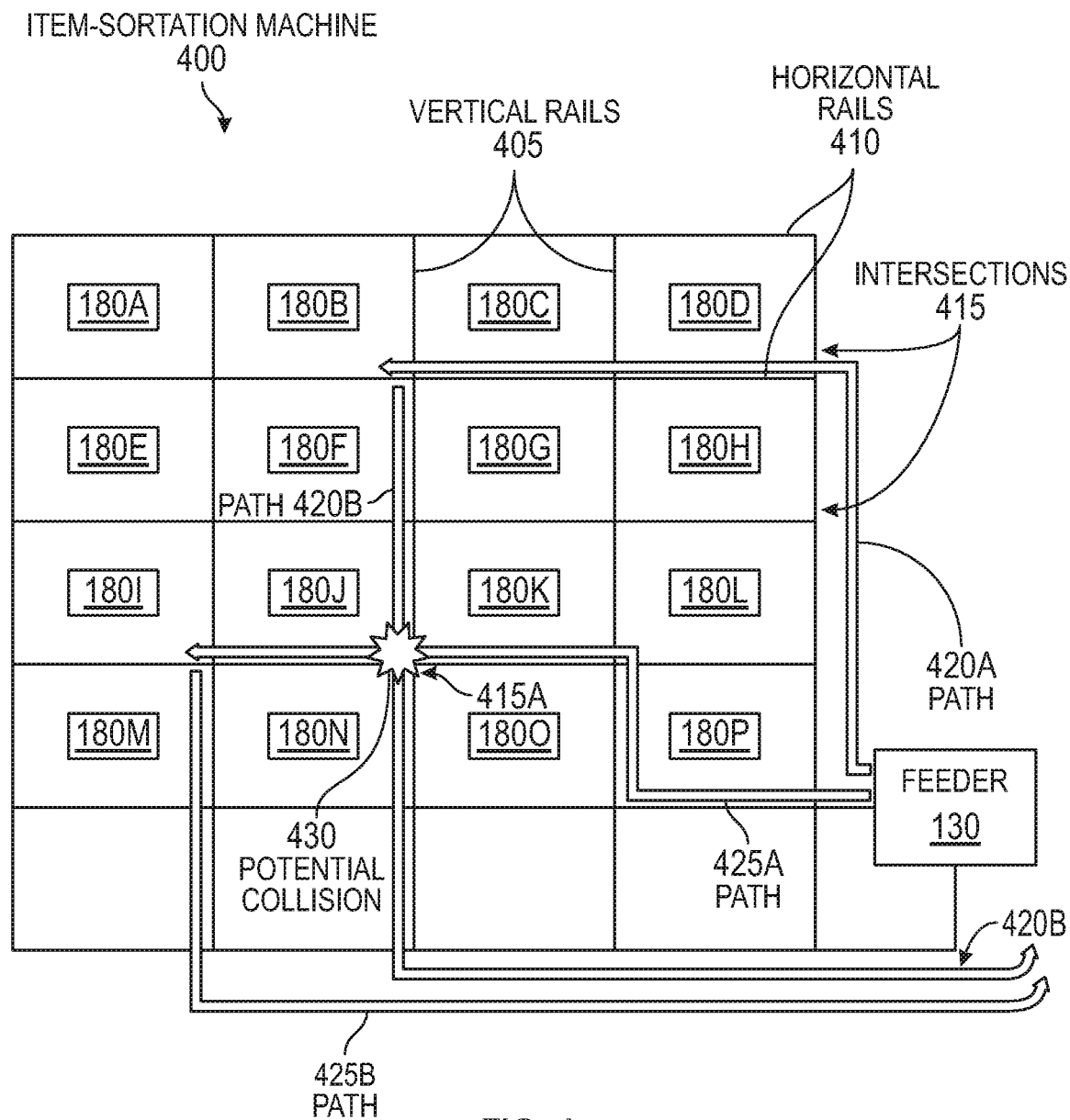
FIG. 4 illustrates robots traveling on predefined paths in an item-sortation machine, according to various embodiments.

FIG. 4 illustrates robots traveling on predefined paths in an item-sortation machine 400, according to various embodiments. The machine 400 includes vertical rails 405 and horizontal rails 410 (which can also be referred to as tracks) on which a robot can travel. That is, the robots may include a movement system that attaches to the rails 405, 410 which permits the robot to move vertically and horizontally through the item-sortation machine. For example, the vertical and horizontal rails 405, 410 cross over each other to form a plurality of intersections 415. At each intersection 415, the robot can continue to move on its current rail or switch to move on the intersecting rail. For example, if the robot is currently on a vertical rail 405 and traveling in the downward direction, at an intersection 415 the robot can continue to move down on the vertical rail 405 or move right or left on the horizontal rail 410. The robots can move on a single rail or move between two rails (e.g., a pair of vertical rails 405 or a pair of horizontal rails 410) when moving through the machine 400.

As shown, the robot can use the vertical and horizontal rails 405, 410 to reach the containers 180. For example, each container 180 may correspond to a unique address or location. As discussed above in method 300, the master controller can provide the address for a container 180 to the robot controller thereby identifying in which container 180 the robot should place the item received from the feeder 130.

FIG. 4 illustrates two different paths that a robot may travel to drop off items. The path 420 is the route a first robot travels to drop off an item at the container 180B while the path 425 is the route a second robot travels to drop off an item at the container 180I. Specifically, the paths 420A and 425A illustrate the routes taken by the robots to drop off the items at their respective containers 180 while the paths 420B and 425B illustrate the routes used by the robots to return to the feeder 130 to retrieve another item.

In one embodiment, the first robot traveling along the path 420 receives its item from the feeder 130 before the second robot traveling along the path 425 receives its item. As such, by the time the first robot has placed the item into the container 180B and is returning to the feeder 130 using the path 420B, the second robot has retrieved its item from the feeder and is heading towards the container 180I using the path 425A. In this example, the paths 420 and 425 cross at the intersection 415A. A collision between the two robots is avoided so long as one of the robots passes through the intersection 415A before the other. However, in this example, it is assumed that the first and second robots both try to pass through the intersection 415A at the same time which may result in a potential collision 430. That is, while the second robot is attempting to move through the intersection 415A using the horizontal rail 410, the first robot attempts to move through the intersection 415A using the vertical rail 405.

As discussed in method 300, the item-sortation machine 400 can arbitrate robot traffic movement through intersections in order to avoid collisions by managing the respective speeds of the robots. For example, the machine 400 may instruct the first robot to slow down when traversing the paths 420A and 420B so that the second robot can pass through the intersection 415A before the first robot reaches the intersection 415A. While FIG. 4 illustrates just two predefined paths, the machine 400 may have any number of robots currently moving through the machine 400 delivering items or returning from delivering items along predefined paths. Each location where the paths cross can result in a potential collision 430. As such, the item-sortation machine 400 can perform any number of collision avoidance techniques (which are described below) to prevent collisions.

Further, potential collisions can occur along the top and bottom horizontal rails 410. For example, the paths 420B and 425B both extend along the bottom horizontal rail, which means there can be a potential collision where the paths 420B and 425B join at the bottom horizontal rail when returning to the feeder 130. In general, a collision can occur where two of the predefined paths cross or overlap. In one embodiment, a collision can occur along the rails at locations that do not include an intersection. For example, a first robot may stop along one of the rails to unload an item while a second robot is traveling on the same rail attempts to move to past the first robot to a location further down the rail. The item-sortation machine may detect this potential collision and slow down or stop the second robot before the collision occurs. In one embodiment, collisions can occur in item-sortation machines that do not have rails that cross over each other as shown in FIG. 4, but rather vertical rails that extend between upper and lower horizontal rails. In this example, the item-sortation machine may not include only two horizontal rails. Each location where the vertical rails join the upper and lower horizontal rails is an intersection.

Figure 5:
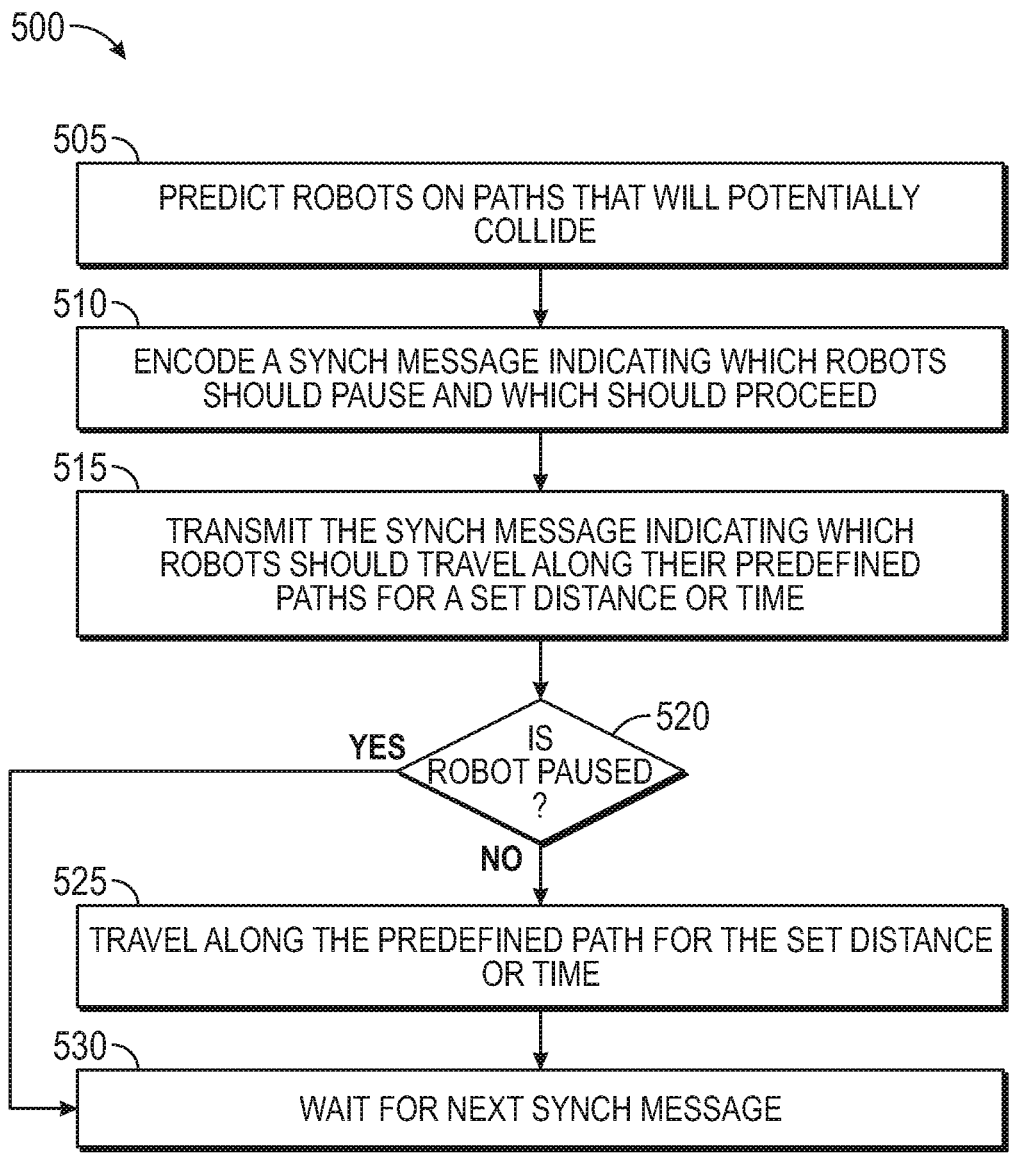
FIG. 5 is a flowchart for using synchronization messages to avoid collisions between robots, according to various embodiments.

FIG. 5 is a flowchart of a method 500 for using synchronization messages to avoid collisions between robots, according to various embodiments. In one embodiment, the method 500 is performed after blocks 305 and 310 where the master controller has provided an address to the robot and the robot controller has selected a predefined path for transporting the item to the location of a destination container.

At block 505, the master controller predicts that at least two robots traveling along predefined paths will collide. In one embodiment, the master controller may receive status updates from the robot controllers indicating the speed of the robots. Because the master controller may also know the predefined paths used by the robots when traveling through the machine, the master controller can use the speed of the robots and their paths to predict the location of the robot in the machine at future times. By calculating one or more future positions for all the robots in the machine, the master controller can determine whether two or more robots may collide in the future.

At block 510, the master controller encodes a synchronization message (a "synch message") indicating which robots should pause and which robots should proceed along their predefined paths. The method 500 assumes that at least two robots are current moving in the item-sortation machine either to deliver an item or return from a delivery. The synch message indicates to these robots that they should continue along their predefined paths for a predefined distance or time.

If two robots are about to collide, the master controller may select one of the robots to stop while the other robot is permitted to continue. Doing so may ensure that the robots do not collide at the location where their predefined paths cross. In one embodiment, the synch message indicates the robots should travel a predefined distance along the predefined path such as a length of the rail (e.g., one foot) or to a predefined waypoint—e.g., the next intersection where horizontal and vertical rails cross. Thus, once the robots travel the defined distance (e.g., once the robot travels a foot along the path or reaches an intersection) and have not received another synch message, the robots stop. In another embodiment, the synch message indicates the robots should travel along their paths for a predefined time period—e.g., two seconds—before stopping if another synch message is not received.

The synch messages provide a mechanism for the master controller to prevent collisions by controlling the movement of the robots. Unlike a system where the master controller provides a series of commands for moving the robots, the master controller can send the synch messages at longer intervals (e.g., less often). Moreover, the synch messages are broadcast messages which provide instructions for all the robots while the master controller would need to send individual control messages targeted to each robot in a communication system where the robots rely on the master controller for every movement made in the machine.

In one embodiment, the synch message includes a plurality of fields (e.g., a bit map or vector) where each field corresponds to one of the robots. The synch message can include a header to indicate the number of fields in the message and their locations. In one embodiment, if the machine includes fifteen robots, the plurality of fields can form a bit map which includes fifteen bits (e.g., control data) where each bit corresponds to one of the robots. When a synch message is received, each of the robots can identify the particular bit in the bit map that corresponds to the robot (i.e., each robot is assigned a unique location in the bit map). If the value of the bit is a "1", the robot knows it can proceed along the path; however, if the value of the bit is a "0", the robot knows it should pause or stop until receiving the next synch message. Thus, if the master controller determines that two robots will collide, the master controller can use the bit map in the synch message to stop one of the robots but allow the other robots to continue along their predefined path to avoid the collision. Put differently, the synch message can stop one of the robots so that the robots do not collide at the location (e.g., an intersection) where their predefined paths cross.

In another embodiment, instead of stopping a robot using a synch message, the master controller may use the synch message to change the speed of the robots to avoid a collision. Instead of either stopping or permitting the robot to travel, the synch message may assign a speed setting to each robot when traveling the defined distance or time. For example, the synch message may include a speed for each robot currently traveling along a predefined path. Because the master controller knows the current location of the robots and the predefined paths they are following, the controller can predict the location of collisions and adjust the speed setting of the robots using one or more synch message. For example, if the master controller predicts that two robots will collide in five seconds, the master controller may slow down one of the robots using multiple synch messages to avoid the collision. For instance, if the master controller sends out a synch message every second, the controller can slow down one of the robots slightly (while letting the other robots move at maximum speed) when sending out the five synch messages before the predicted collision. Alternatively, the master controller may wait until immediately before the predicted collision to drastically slow down one of the robots relative to the other.

At block 515, the master controller transmits the synch message indicating the robots should travel along the predefined paths for a set distance or time. The robot controllers decode the synch message and determine whether to continue along their path, stop, or change speeds. The robots that are waiting in a queue at the feeder for a new item to transport may ignore the synch messages since they are not currently moving.

Regardless of how the master controller avoids collisions using the synch messages, the synch messages can be sent so that the robots move fluidly through the machine (assuming the robots do not need to be paused to avoid a collision). That is, the master controller may transmit a new synch message before the robots have went the predefined distance or traveled the predefined time permitted by the previous synch message. That way, the robot controllers already know whether they can continue on the path before they have traveled the distance allowed by the previous synch message. Thus, barring collision avoidance, to a user watching the robots, it appears as the robots move continually along the predefined paths except for pausing to unload an item into a container.

In one embodiment, the synch message can be combined with the heartbeat signal (e.g., an E-stop signal). For example, the same signal used to transmit the heartbeat signal can include the information in the synch message for selectively pausing or slowing down one or more of the robots to avoid collisions.

At block 520, the robot controller determines whether it should pause the robot. That is, the synch message may indicate using a plurality of fields forming a bit map that two of the robots currently traveling on the paths should stop to avoid a collision. As mentioned above, in other embodiments, the synch message may slow down robots (rather than stop them completely) to avoid collisions. If the robot was not paused by the sync message, the method 500 proceeds to block 525 where the robot travels the predefined path for the distance or time set by the received synch message.

At block 530, assuming the master controller has not sent another synch message and the robots have traveled the predefined distance or time permitted by the previously received synch message, the robot controllers stop the robots and wait for the next synch message. For example, the method 500 may repeat where the master controller reevaluates the current position and velocities to identify additional future potential collisions. That is, pausing or slowing down one robot may result in a new potential collision. The master controller can then avoid the new potential collision using the synch messages. However, if there are no more future collisions, the synch messages can instruct all the robots currently traversing the predefined paths to continue along those paths.

Figure 6:
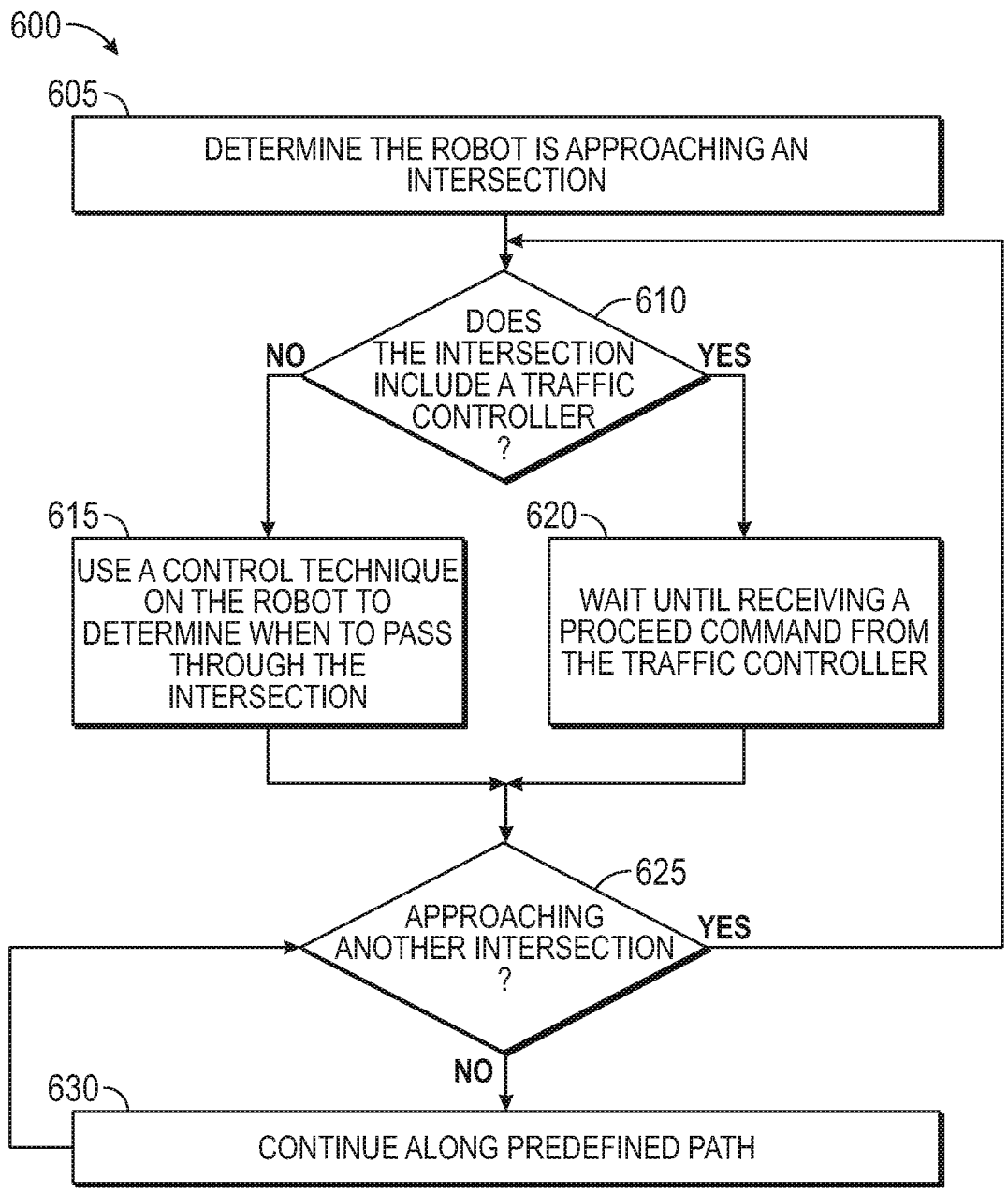
FIG. 6 is a flowchart for avoiding collisions between robots, according to various embodiments.

FIG. 6 is a flowchart of a method 600 for use avoiding collisions between robots, according to various embodiments. In one embodiment, the method 600 is performed after blocks 305 and 310 of method 300 where the master controller has provided an address to the robot and the robot controller has selected a predefined path for transporting the item to the location of a destination container. Further, in one embodiment, the method 600 is performed without receiving synch messages from the master controller to coordinate the movement of the robots.

At block 605, the robot controller determines that the robot is approaching an intersection. In one embodiment, the intersection is a location where the paths of two robots cross. For example, as shown in FIG. 4, the intersections can be the location where the vertical and horizontal rails cross. However, the intersection can be any point or location where robots traveling on predefined paths may collide. The intersections may be predefined (e.g., known) or can be dynamically determined using, e.g., proximity sensors on the robots which detect when one robot is approaching another robot in the item-sortation machine.

The method 600 splits at block 610 based on whether the intersection has a traffic controller. If not, the method 600 proceeds to block 615 where the robot controller uses a control technique on the robot to determine when to pass through the intersection. That is, the robot controller includes logic for determining whether it can pass through the intersection or should stop. In one embodiment, the robot controller makes this determination without relying on an instruction from the master controller. Put differently, the robot controller can use information available from local sensors (e.g., the location of neighboring robots) or information received from neighboring robots (e.g., the robots may transmit their locations directly to each other without relying on the master controller) or use predefined time slots to determine whether the robot should pass through the intersection. For example, if the robot controller determines using its sensors or by knowing the location of the other robots in the machine that there are no other robots about to pass through the intersection, the robot can move through the intersection.

In another example, the intersections may have assigned time slots for robots to pass through the intersection. The intersection may have set entry points which each are allotted a particular time slot. For example, a robot can enter the intersection from a first entry point (e.g., from the right along a horizontal rail) only on even seconds and can enter the intersection from a second entry point (e.g., from above along a vertical rail) only on odd seconds. The robot controllers can maintain clocks and when approaching an intersection, check the clock to see whether the current time has an even or odd second time value. Doing so informs the robot controller whether it can enter the intersection or should stop, thereby permitting a robot at a different entry point of the intersection to pass through. In this embodiment, the robot controllers can perform a collision avoidance algorithm without relying on proximity sensors or communication with other robots (which may reduce the wireless bandwidth used by the robots).

In other embodiments, the robot controllers may use a combination of the factors above when determining whether to pass through the intersection. For example, if a proximity sensor on the robot indicates another robot is within two feet of the robot, the robot controller may use the predefined time slots to determine whether it can pass through the intersection. However, if the proximity sensor indicates there are no nearby robots, the robot controller may permit the robot to pass through the intersection regardless of the current time.

If the intersection does include a traffic controller, the method 600 proceeds to block 620 where the robot controller waits until receiving a proceed command from the traffic controller before entering the intersection. The traffic controller may transmit a wireless command intended for the robot or robots approaching the intersection. However, in other embodiment, the traffic controller uses wired communication techniques for communicating with the robot. For example, the traffic controller and the robot controller may transmit data messages using the rails which can include one or more conductive wires. In this example, communication between the traffic controller and the robot does not use any wireless bandwidth. Further, the item-sortation machine can include proximity sensors along the rails that detect when robots approach an intersection. The information measured by these sensors can be transmitted to the traffic controller and/or to the robot controller using wired communication techniques. In this manner, the traffic controller can identify the locations of the robots as they approach the intersections.

In another embodiment, the master controller may provide the location of the robots that are near the intersection to the traffic controller (although in other embodiments the master controller may perform the traffic control function for each intersection rather than using separate traffic controllers). Regardless how the locations of the robots are identified, the traffic controller selects which of the robots can pass through the intersection using, e.g., a priority associated with the robots, which robot is closest to the intersection, which robot has the lowest charge on its power supply, etc. The traffic controller then transmits one or more wireless messages instructing one of the robots to pass through the intersection while one or more other robots are stopped or slowed down so they do not enter the intersection.

After passing through the intersection using the one or more collision avoidance techniques described in blocks 615 and 620, at block 625 the robot controller determines whether the robot is approaching another intersection in the machine. If so, the method 600 returns to block 610 to again use one or more of the collision avoidance techniques described above to determine whether the robot can pass through the intersection. If not, the method 600 proceeds to block 630 where the robot continues along the predefined path. That is, unlike the collision avoidance techniques in method 500 where the master controller transmits synch messages that permit the robots to move along the predefined paths in intervals, using method 600 the robots can move along their paths without waiting on synch messages from the master controller. Instead, the robot may stop or pause along the predefined path at one more intersections along that path to avoid a collision with another robot moving in the machine. As such, the embodiments described in method 600 may use less bandwidth than the techniques used in method 500 but may use more complicated logic or additional sensors on the robots than the method 500.

Figure 7:
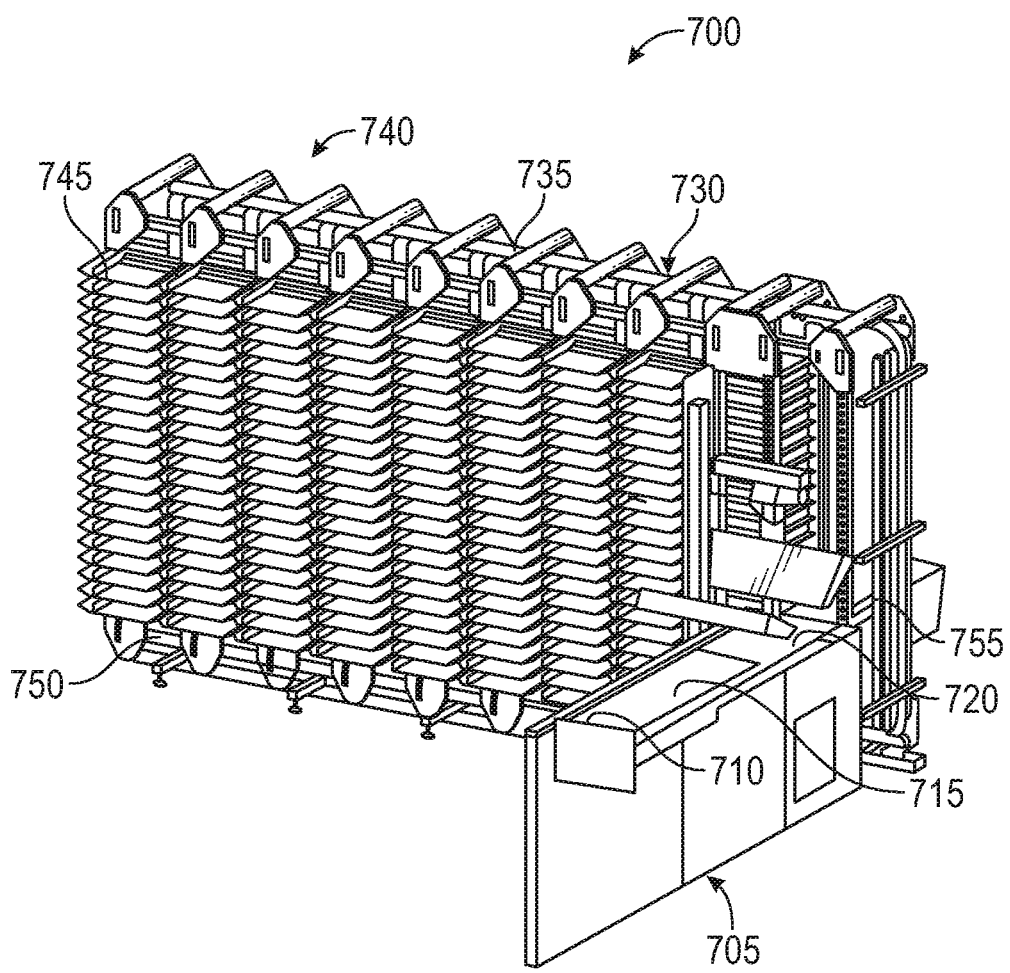

Referring now to FIGS. 7 and 8, an apparatus which is one example of an item sortation machine 100 shown in FIG. 1 for sorting items such as documents or mail pieces is designated generally 700. The system 700 includes a plurality of delivery cars 805 (e.g., the robots 140 shown in FIG. 1) to deliver items (e.g., item 125) to a plurality of sort locations, such as output bins 745 (e.g., containers 180). At a loading station 755, each car 805 receives an item from an input station 705 and delivers it to the appropriate bin.

The cars 805 travel along a track 730 to the sort locations. The track has a horizontal upper rail 735 and a horizontal lower rail 750, which operates as a return leg. A number of parallel vertical track legs extend between the upper rail 735 and the lower return rail 750. In the present instance, the bins 745 are arranged in columns between the vertical track legs.

After a piece is loaded onto a car, the car travels upwardly along two pairs of vertical tracks legs and then horizontally along two upper tracks 735. The car 805 travels along the upper rail until it reaches the appropriate column containing the bin for the piece that the car is carrying. The car 805 then discharges the piece into the bin using a transport device or system.

After discharging the piece, the car 805 continues down the vertical legs of the column until it reaches the lower rail 750 which the car follows until returning to the loading station 755 to receive another item.

The cars 805 are semi-autonomous vehicles that each has an onboard power source (e.g., power source 155) and an onboard motor (e.g., a movement system 150) to drive the cars along the track 730. The cars also include a loading/unloading mechanism (e.g., the transport device 145), such as a conveyor, for loading pieces onto the cars and discharging the pieces from the cars.

Since the system 700 includes a number of cars 805, the positioning of the cars is controlled using, e.g., the collision avoidance techniques described above to ensure that the different cars do not crash into each other. Further, the control system may output a heartbeat signal, e.g., using a heartbeat controller 115. The cars 805 perform the commands to move the pieces throughout the system 700 so long as the heartbeat signal is active as described above.

At the input station 705, the mail pieces are separated from one another so that the pieces can be conveyed serially to the loading station 755 to be loaded onto the cars 805. Additionally, at the input station information is determined for each piece using, for example, a bar code scanner or a mailing address so that the piece can be sorted to the appropriate bin.

A variety of configurations may be used for the input station, including manual or automatic configurations or a combination of manual and automated features. In a manual system, the operator enters information for each piece and the system sorts the mail piece accordingly. In an automatic system, the input system includes elements that scan each mail piece and detect information regarding each piece. The system then sorts the mail piece according to the scanned information.

In an exemplary manual configuration, the input system includes a work station having a conveyor, an input device, and a monitor. The operator reads information from a mail piece and then drops the piece onto a conveyor that conveys the piece to the loading station 755.

In an exemplary automatic configuration, the system includes an imaging station, having an imaging device such as a high speed line scanning camera. In one example, the imaging station scans a bar code on each mail piece to detect information regarding the destination for each piece. The system analyzes the image data to determine the destination information and then controls the cars to move the piece into a bin corresponding to the destination.

FIGS. 7 and 8 illustrate such an automated system. A feeder 710 in the input bin serially feeds mail pieces from the input bin to a conveyor 715. An imaging station 720 positioned along the conveyor scans the mails pieces as the pieces are conveyed to the loading station 755. The system 700 analyzes a bar code or mailing address to read information for the mail piece.

The conveyor 715 conveys the mail piece to the loading station 755 where it is loaded onto a car 805.

The input station 705 may be configured in a wide range of options. The options are not limited to those configurations described above, and may include additional features, such as an automated scale for weighing each piece, a labeler for selectively applying labels to the mail pieces and a printer for printing information on the mail pieces or on the labels.

In one embodiment, the system 700 includes a plurality of input stations which may increase the feed rate of pieces. In addition, the input stations may be configured to process different types of items. In this way, each input station could be configured to efficiently process a particular category of items. For instance, if the system is configured to process documents, such as mail, one input station may be configured to process standard envelopes, while another input station may be configured to process larger mails, such as flats. Similarly, one input station may be configured to automatically process mail by scanning it and automatically determining the recipient. The second input station may be configured to process rejects, such as by manually keying in information regarding the recipient.

The system includes a sorting station 740 which includes an array of bins 745 for receiving the pieces. Additionally, the sorting station 740 includes the track 730 for guiding the cars 805 to the bins 745.

In one embodiment, during transport, the cars travel up a pair of vertical legs from the loading station 755 to the upper rail 735 as dictated by a predefined path (in one example, the cars actually travel up two pairs of rails because the track includes a forward track and a parallel opposing track). The car then travels along the upper rail until reaching the column having the appropriate bin. The car then travels downwardly along two front vertical posts and two parallel rear posts until reaching the appropriate bin, and then discharges the mail piece into the bin. According to the predefined path, the car then continues down the vertical legs until reaching the lower horizontal rail 750. The car then follows the lower rail back toward the loading station.

As can be seen in FIG. 8, the track 730 includes a front track 810 and a rear track 815. The front and rear tracks 810, 815 are parallel tracks that cooperate to guide the cars around the track. In one embodiment, each of the cars includes four wheels: two forward wheel and two rearward wheels. The forward wheels ride in the front track, while the rearward wheels ride in the rear track. It should be understood that in the discussion of the track the front and rear tracks 810, 815 are similarly configured opposing tracks that support the forward and rearward wheels of the cars. Accordingly, a description of a portion of either the front or rear track also applies to the opposing front or rear track.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An item-sortation machine, comprising:
 a plurality of robots;
 a track providing paths to a plurality of containers, wherein each of the plurality of robots comprises a movement system configured to use the track to reach the plurality of containers;
 a feeder configured to place a first item on a first robot of the plurality of robots and a second item on a second robot of the plurality of robots; and
 a master controller configured to:
  identify a first destination container of the plurality of containers for the first item and a second destination container of the plurality of containers for the second item,
  transmit a first wireless packet to the first robot, wherein the first wireless packet comprises a first address corresponding to the first destination container, and
  transmit a second wireless packet to the second robot, wherein the second wireless packet comprises a second address corresponding to the second destination container,
 wherein the first robot comprises a first robot controller configured to:
  identify a first predefined path along the track by selecting the first predefined path from a first plurality of paths stored in the first robot based on the first address, wherein each of the first plurality of paths corresponds to a different one of the plurality of containers, wherein the first predefined path leads the first robot to the first destination container,
 wherein the second robot comprises a second robot controller configured to:
  identify a second predefined path along the track by selecting the second predefined path from a second plurality of paths stored in the second robot based on the second address, wherein each of the second plurality of paths corresponds to a different one of the plurality of containers, wherein the second predefined path leads the second robot to the second destination container, and
  perform a collision avoidance technique at an intersection on the track to avoid a collision with the first robot moving along the first predefined path which crosses over the second predefined path.

2. The item-sortation machine of claim 1, wherein the track comprises a plurality of vertical and horizontal rails, wherein the intersection is a location were at least one of the vertical rails joins at least one of the horizontal rails.

3. The item-sortation machine of claim 1, wherein, when performing the collision avoidance technique, the second robot controller instructs the second robot to stop before entering the intersection to provide sufficient time for the first robot to pass through the intersection when moving along the first predefined path.

4. The item-sortation machine of claim 1, wherein the master controller is configured to transmit a heartbeat signal to the plurality of robots, wherein the first and second robots move along the first and second predefined paths, respectively, so long as the heartbeat signal is received.

5. A system, comprising:
 a plurality of robots;
 a plurality of locations for unloading items into a plurality of containers, wherein the plurality of robots comprises movement systems configured to move the plurality of robots to the plurality of locations;
 a feeder configured to place an item on a first robot of the plurality of robots; and
 a master controller configured to:
  transmit a wireless packet to the first robot, wherein the wireless packet identifies a first location of the plurality of locations,
 wherein the first robot comprises a robot controller configured to:
  select a first predefined path corresponding to the first location by selecting the first predefined path from a plurality of paths stored in the first robot each corresponding to a different one of the plurality of locations, wherein the first predefined path leads the first robot to the first location, and
  perform a collision avoidance technique at an intersection between the first predefined path and a second predefined path to avoid a collision with a second robot of the plurality of robots moving along the second predefined path.

6. The system of claim 5, wherein the plurality of robots each use the first predefined path when delivering items to the first location.

7. The system of claim 5, wherein the master controller is configured to:
 predict that the first and second robots will collide at the intersection based on current locations of the first and second robots along the first and second predefined paths, respectively; and
 transmit a synchronization message to the plurality of robots indicating which of the plurality of robots are permitted to move at least one of a predefined distance and a predefined time along respective predefined paths.

8. The system of claim 7, wherein the synchronization message comprises a plurality of fields storing control data for the plurality of robots,
 wherein performing the collision avoidance technique on the first robot comprises decoding the synchronization message to identify the control data corresponding to the first robot and whether the control data indicates an action that the first robot should perform to avoid colliding with the second robot.

9. The system of claim 8, wherein the action comprises at least one of stopping the first robot until a subsequent synchronization message is received, or reducing a speed of the first robot as the first robot travels along the first predefined path until the subsequent synchronization message is received.

10. The system of claim 8, wherein a robot controller in the second robot is configured to decode the synchronization message to identify the control data corresponding to the second robot and determine that the control data indicates that the second robot should not reduce its speed when traveling on the second predefined path.

11. The system of claim 5, wherein performing the collision avoidance technique comprises:
    determining that the first robot is approaching the intersection; and
    waiting until receiving a wireless proceed command indicating the first robot can pass through the intersection.

12. The system of claim 5, wherein performing the collision avoidance technique comprises:
    detecting a presence of the second robot using a proximity sensor disposed on the first robot; and
    determining, based on the detected presence of the second robot, that the first robot can pass through the intersection without colliding with the second robot.

13. The system of claim 5, wherein performing the collision avoidance technique comprises:
    receiving a location of the second robot using wireless communication; and
    determining, based on comparing the location of the second robot to a location of the first robot, that the first robot can pass through the intersection without colliding with the second robot.

14. The system of claim 5, wherein performing the collision avoidance technique comprises:
    identifying a current time and an entry point used by the first robot when approaching the intersection;
    comparing the current time with a time slot allocated for entering the intersection at the entry point used by the first robot; and
    stopping the first robot until the current time falls within the time slot.

15. A method, comprising:
    placing an item on a first robot of a plurality of robots;
    transmitting a wireless packet to the first robot, wherein the wireless packet identifies a first location of a plurality of locations for unloading items into a plurality of containers;
    selecting, at the first robot, a first predefined path corresponding to the first location by selecting the first predefined path from a plurality of paths stored in the first robot each corresponding to a different one of the plurality of locations, wherein the first predefined path leads the first robot to the first location; and
    performing a collision avoidance technique at an intersection between the first predefined path and a second predefined path to avoid a collision with a second robot of the plurality of robots moving along the second predefined path.

16. The method of claim 15, wherein the plurality of robots each use the first predefined path when delivering items to the first location.

17. The method of claim 15, further comprising:
    predicting that the first and second robots will collide at the intersection based on current locations of the first and second robots along the first and second predefined paths, respectively; and
    transmitting a synchronization message to the plurality of robots indicating which of the plurality of robots are permitted to move at least one of a predefined distance and a predefined time along respective predefined paths.

18. The method of claim 17, wherein the synchronization message comprises a plurality of fields storing control data for the plurality of robots,
    wherein performing the collision avoidance technique on the first robot comprises decoding the synchronization message to identify the control data corresponding to the first robot and an action the first robot should perform to avoid colliding with the second robot.

19. The method of claim 15, wherein performing the collision avoidance technique comprises:
    receiving a location of the second robot using wireless communication; and
    determining, based on comparing the location of the second robot to a location of the first robot, that the first robot can pass through the intersection without colliding with the second robot.

20. The method of claim 15, wherein performing the collision avoidance technique comprises:
    identifying a current time and an entry point used by the first robot when approaching the intersection;
    comparing the current time with a time slot allocated for entering the intersection at the entry point used by the first robot; and
    stopping the first robot until the current time falls within the time slot.

* * * * *

UNITED STATES PATENT AND TRADEMARK OFFICE
CERTIFICATE OF CORRECTION

| | | |
|---|---|---|
| PATENT NO. | : 11,086,336 B1 | Page 1 of 1 |
| APPLICATION NO. | : 16/000766 | |
| DATED | : August 10, 2021 | |
| INVENTOR(S) | : Josephine Ammer Bolotski et al. | |

It is certified that error appears in the above-identified patent and that said Letters Patent is hereby corrected as shown below:

In the Claims

In Column 20, Line 5, in Claim 2, delete "were" and insert -- where --, therefor.

Signed and Sealed this
Nineteenth Day of October, 2021

Drew Hirshfeld
*Performing the Functions and Duties of the
Under Secretary of Commerce for Intellectual Property and
Director of the United States Patent and Trademark Office*